US010832658B2

(12) United States Patent
Gunasekara et al.

(10) Patent No.: US 10,832,658 B2
(45) Date of Patent: Nov. 10, 2020

(54) QUANTIZED DIALOG LANGUAGE MODEL FOR DIALOG SYSTEMS

(71) Applicant: International Business Machines Corporation, Armonk, NY (US)

(72) Inventors: Chulaka Gunasekara, Yorktown Heights, NY (US); David Nahamoo, Great Neck, NY (US); Lazaros Polymenakos, West Harrison, NY (US); Kshitij Fadnis, White Plains, NY (US); David Echeverria Ciaurri, New York, NY (US); Jatin Ganhotra, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 160 days.

(21) Appl. No.: 15/915,307

(22) Filed: Mar. 8, 2018

(65) Prior Publication Data
US 2019/0147853 A1    May 16, 2019

Related U.S. Application Data

(60) Provisional application No. 62/586,279, filed on Nov. 15, 2017.

(51) Int. Cl.
*G10L 15/06*      (2013.01)
*G06N 3/08*       (2006.01)
(Continued)

(52) U.S. Cl.
CPC ...... *G10L 15/063* (2013.01); *G06F 16/90332* (2019.01); *G06F 40/216* (2020.01);
(Continued)

(58) Field of Classification Search
CPC ....... G10L 15/063; G10L 15/14; G10L 15/16; G10L 15/183; G06N 3/0445; G06N 3/0472; G06N 3/08
See application file for complete search history.

(56) References Cited

U.S. PATENT DOCUMENTS 5,452,397 A  *  9/1995  Ittycheriah .............. G10L 15/07
                                                    704/240
5,457,768 A  *  10/1995  Tsuboi .................... G10L 15/18
                                                    704/219
(Continued)

OTHER PUBLICATIONS

D. Madan, "Finding Dominant User Utterances and System Responses in Conversations." (Submitted on Oct. 29, 2017) https://arxiv.org/abs/1710.10609.
(Continued)

*Primary Examiner* — Fariba Sirjani
(74) *Attorney, Agent, or Firm* — Garg Law Firm, PLLC; Rakesh Garg; Anthony Curro

(57) ABSTRACT

A method, program product and computer system to predict utterances in a dialog system includes receiving a set of utterances associated with a dialog between a client device and a dialog system, mapping the utterances to vector representations of the utterances, and identifying at least one cluster to which the utterances belong from among a plurality of possible clusters. A next cluster is predicted based upon a conditional probability of the next cluster following a set of a predetermined number of previous clusters using a language model. A next utterance is predicted from among a plurality of possible utterances within the predicted next cluster.

20 Claims, 10 Drawing Sheets

(51) Int. Cl.

| | | |
|---|---|---|
| *G06N 3/04* | (2006.01) | |
| *G10L 15/14* | (2006.01) | |
| *G10L 15/183* | (2013.01) | |
| *G10L 15/16* | (2006.01) | |
| *G06F 16/9032* | (2019.01) | |
| *G06F 40/35* | (2020.01) | |
| *G06F 40/216* | (2020.01) | |
| *G06F 40/284* | (2020.01) | |
| *H04L 12/58* | (2006.01) | |

(52) U.S. Cl.
CPC ............ *G06F 40/284* (2020.01); *G06F 40/35* (2020.01); *G06N 3/0445* (2013.01); *G06N 3/0472* (2013.01); *G06N 3/08* (2013.01); *G10L 15/14* (2013.01); *G10L 15/16* (2013.01); *G10L 15/183* (2013.01); *H04L 51/02* (2013.01)

(56) References Cited

U.S. PATENT DOCUMENTS

| | | | | |
|---|---|---|---|---|
| 5,640,488 | A * | 6/1997 | Junqua | A61N 5/04 704/245 |
| 5,694,558 | A * | 12/1997 | Sparks | H04M 3/493 715/854 |
| 5,787,395 | A * | 7/1998 | Minamino | G10L 15/08 704/255 |
| 5,828,991 | A * | 10/1998 | Skiena | G06F 40/253 704/9 |
| 5,960,384 | A * | 9/1999 | Brash | G06F 40/205 704/9 |
| 5,991,712 | A * | 11/1999 | Martin | G10L 15/1815 704/10 |
| 6,173,261 | B1 * | 1/2001 | Arai | G10L 15/063 704/257 |
| 6,556,973 | B1 * | 4/2003 | Lewin | G06F 40/211 704/277 |
| 6,754,626 | B2 | 6/2004 | Epstein | |
| 6,839,671 | B2 * | 1/2005 | Attwater | G10L 15/1822 704/238 |
| 7,143,035 | B2 | 11/2006 | Dharanipragada et al. | |
| 7,606,714 | B2 | 10/2009 | Williams et al. | |
| 7,933,774 | B1 | 4/2011 | Begeja et al. | |
| 8,442,812 | B2 | 5/2013 | Ehsani et al. | |
| 8,554,542 | B2 * | 10/2013 | Sandor | G06F 40/30 704/9 |
| 8,676,565 | B2 * | 3/2014 | Larcheveque | G06F 17/2785 704/9 |
| 8,892,419 | B2 | 11/2014 | Lundberg et al. | |
| 9,070,388 | B2 * | 6/2015 | Yamada | C23F 4/00 |
| 9,437,189 | B2 | 9/2016 | Epstein et al. | |
| 9,472,190 | B2 * | 10/2016 | Yue | G10L 15/083 |
| 9,473,637 | B1 * | 10/2016 | Venkatapathy | G06F 16/90332 |
| 9,588,964 | B2 * | 3/2017 | Chang | G06F 40/40 |
| 9,594,737 | B2 * | 3/2017 | Wolfram | G06F 40/14 |
| 2002/0032564 | A1 * | 3/2002 | Ehsani | G06F 17/2775 704/235 |
| 2003/0091163 | A1 * | 5/2003 | Attwater | G10L 15/1822 379/88.01 |
| 2004/0199375 | A1 * | 10/2004 | Ehsani | G06F 17/2775 704/4 |
| 2005/0105712 | A1 * | 5/2005 | Williams | H04M 3/5166 379/265.02 |
| 2006/0074671 | A1 * | 4/2006 | Farmaner | G10L 15/193 704/257 |
| 2008/0319747 | A1 * | 12/2008 | Kompe | G10L 15/065 704/245 |
| 2009/0112596 | A1 * | 4/2009 | Syrdal | G10L 13/027 704/260 |
| 2009/0254348 | A1 * | 10/2009 | Moore | G10L 15/22 704/260 |
| 2011/0238409 | A1 * | 9/2011 | Larcheveque | G06F 17/2785 704/9 |
| 2015/0348543 | A1 * | 12/2015 | Zhao | G10L 15/19 704/257 |
| 2016/0154783 | A1 * | 6/2016 | Hebert | G06F 16/9537 707/755 |
| 2017/0372200 | A1 * | 12/2017 | Chen | G06N 3/08 |
| 2018/0174020 | A1 * | 6/2018 | Wu | G06N 3/006 |
| 2019/0043483 | A1 * | 2/2019 | Chakraborty | G10L 15/063 |
| 2019/0065576 | A1 * | 2/2019 | Peng | G06F 16/22 |
| 2019/0095425 | A1 * | 3/2019 | Galitsky | G06F 17/278 |

OTHER PUBLICATIONS

A. Bordes, "Learning End-to-End Goal-Oriented Dialog." (Submitted on May 24, 2016 (v1), last revised Mar. 30, 2017 (this version, v4)). https://arxiv.org/abs/1605.07683.

W. Xu, "Language modeling for dialog system." Proceedings of ICSLP'00. Paper B 1-06, 2000. Sixth International Conference on Spoken Language Processing, ICSLP 2000 / INTERSPEECH 2000, Beijing, China, Oct. 16-20, 2000.

R. Kneser, "Semantic clustering for adaptive language modeling." Published in: 1997 IEEE International Conference on Acoustics, Speech, and Signal Processing, 1997. ICASSP-97. Date of Conference: Apr. 21-24, 1997.

I. Lane, "Language Model Switching Based on Topic Detection for Dialog Speech Recognition." Published in: 2003 IEEE International Conference on Acoustics, Speech, and Signal Processing, 2003. Proceedings. (ICASSP '03). Date of Conference: Apr. 6-10, 2003.

J. Lucas-Cuesta, "Mutual Information and Perplexity Based Clustering of Dialogue Information for Dynamic Adaptation of Language Models." Advances in Speech and Language Technologies for Iberian Languages pp. 148-157. In: Torre Toledano D. et al. (eds) Advances in Speech and Language Technologies for Iberian Languages. Communications in Computer and Information Science, vol. 328. Springer, Berlin, Heidelberg.

F. Bechet, "Mining Spoken Dialogue Corpora for System Evaluation and Modeling." In Proceedings of EMNLP, Barcelone, Spain (2004).

S. Negi, "Automatically Extracting Dialog Models from Conversation Transcripts," 2009 Ninth IEEE International Conference on Data Mining, Miami, FL, 2009, pp. 890-895, 2009.

Li et al; Deep Reinforcement Learning for Dialogue Generation, arXiv:1606.01541v4 [cs.CL] Sep. 29, 2016.

Serban et al; Building End-to-End Dialogue Systems Using Generative Hierarchical Neural Network Models, Proceedings of the Thirtieth AAAI Conference on Artificial Intelligence (AAAI-2016).

* cited by examiner

BEFORE PREPROCESSING 702

U: good Morning
S: hello what can I help you with today
U: can you book a table with french cuisine in a moderate price range in rome
S: i'm on it
S: how many people would be in your party
U: for four people please
S: ok let me look into some options for you
S: what do you think of this option: resto_rome_moderate_french_7stars
U: no this does not work for me
S: sure let me find an other option for you
S: what do you think of this option: resto_rome_moderate_french_6stars
U: let's do it
S: great let me do the reservation

AFTER PREPROCESSING 704

U: good morning
S: hello what can i help you with today
U: can you book a table with CUISINE_TYPE cuisine in a PRICE_RANGE price range in LOCATION
S: i'm on it
S: how many people would be in your party
U: for NUMBER_OF_PEOPLE people please
S: ok let me look into some options for you
S: what do you think of this option: RESTAURANT_NAME
U: no this does not work for me
S: sure let me find an other option for you
S: what do you think of this option: RESTAURANT_NAME
U: let's do it
S: great let me do the reservation

QUANTIZED DIALOG LANGUAGE MODEL FOR DIALOG SYSTEMS

TECHNICAL FIELD

The present invention relates generally to a method, system, and computer program product for automated dialog systems. More particularly, the present invention relates to a method, system, and computer program product for a dialog system using the quantized dialog language model.

BACKGROUND

A natural language is a scripted (written) or a vocalized (spoken) language having a form that is employed by humans for primarily communicating with other humans or with systems having a natural language interface. Natural language processing (NLP) is a technique that facilitates exchange of information between humans and data processing systems. For example, one branch of NLP pertains to transforming human readable or human understandable content into machine usable data. For example, NLP engines are presently usable to accept input content such as a newspaper article or human speech, and produce structured data, such as an outline of the input content, most significant and least significant parts, a subject, a reference, dependencies within the content, and the like, from the given content.

Another branch of NLP pertains to answering questions about a subject matter based on information available about the subject matter domain. This is a branch of cognitive analytics, and is also referred to as a Question and Answer system (Q and A system). Cognitive analytics is the process of analyzing available information or knowledge to create, infer, deduce, or derive new information.

Information about a domain can take many forms, including but not limited to knowledge repositories and ontologies. For example, domain-specific information can take the form of a list of words, phrases, and their equivalents as relate to a product.

Such information can be sourced from any number of data sources. The presenter of the information generally selects the form and content of the information. Before information can be used for NLP, generally, the information has to be transformed into a form that is usable by an NLP engine.

Shallow parsing is a term used to describe lexical parsing of a given content using NLP. For example, given a sentence, an NLP engine determining what the sentence semantically means according to the grammar of the language of the sentence is the process of lexical parsing, to wit, shallow parsing. In contrast, deep parsing is a process of recognizing the relationships, predicates, or dependencies, and thereby extracting new, hidden, indirect, or detailed structural information from distant content portions in a given document or some corpora.

An NL input is an input constructed using a grammar of a natural language and presented in a suitable form, including but not limited to text, audio, and forms thereof, such as transcription from audio speech, machine-generated audio from text. A unit of an NL input is the shortest meaningful portion of the input. For example, in the English language, a unit would be a word; and words form other larger structures such as phrases, sentences, and paragraphs in the NL input. A unit of an NL input is also referred to herein as a token or an utterance.

An "utterance" as used herein is a spoken word or phrase in a natural language. A dialog is a human-like conversation using natural language speech. The conversation may occur between a human user and a machine, or between two machines. A dialog system is a computer system configured to implement such a dialog using text, speech, or other user inputs. Given a sentence as a sequence of words, e.g., an input user utterance, the dialog system products an output utterance. A goal-oriented dialog system is configured to understand a user's input utterances and guide the user to accomplishing a goal or complete a task within a limited number of utterances. Examples of such goals include making a reservation, obtaining technical support, or getting advice.

Two types of existing dialog systems include a common conversation architecture dialog system and an end-to-end dialog system. A common conversation architecture requires explicit designing and training of all the components of the dialog system separately and encoding the rules of the interactions. It is shown in literature that such rules-based systems do not typically generalize well. End-to-end dialog systems require a large amount of data to learn complex rules and logic required in conversation systems. End-to-end memory networks have been applied to dialog systems for utterance prediction. The illustrative embodiments recognize that the performance of these systems on goal-oriented dialog applications have so far not been satisfactory for practical use.

Many existing work on utterance prediction is based on generative models. With the advancement of deep learning techniques, Recurrent Neural Networks (RNNs) have shown good performance on dialog applications. In particular, researchers have proposed several sequence-to-sequence (Seq2Seq) encoder-decoder models for dialog response generation. In such tasks, the model must generate an appropriate response given a dialog context. One of the main issues with this approach is that it tends to generate a lot of generic and unrelated responses. One example is that some Seq2Seq models tend to generate the highly generic response I don't know regardless of the input. Also, these algorithms require a lot of training data for the systems to achieve satisfactory performance levels, as they need to learn all the components of a dialog system by data.

Traditionally, the models that assign probabilities to sequences of words are called language models. The simplest model that assigns probabilities to sequences of words are n-gram language models. An n-gram is a sequence of n words: a 2-gram (or bigram) is a two-word sequence like "I would" or "would like" and a 3-gram (or trigram) is a three-word sequence like "I would like", or "would like to". In n-gram language models, we estimate probability of each word given n-1 words of prior context. The most common way to estimate these probabilities is called maximum likelihood estimation or MLE. The maximum likelihood estimate for a parameter of an n-gram model is identified by the counts from a corpus, normalized, so that they lie between 0 and 1. These language models are very common in dialog systems. Language model being conditioned on a state of dialog associated have been proposed. But these models generate utterances word by word. In spoken-dialog systems, the decoders use a language model to improve recognition accuracy of user utterances. In text-based dialog systems (chatbots), language models are used to improve the accuracy of system utterance generation.

Learning conversational models from data without explicitly encoding all the components and the rules of the interactions is what is referred to as implicit dialog systems. Such systems depend on the underlying data and their representations in order to build all the components required for dialog interaction. One or more illustrative embodiments address the problem of utterance prediction in implicit dialog systems using a Quantized Dialog Language Model.

Predicting the next utterance of a dialog is a common challenge that is faced by many researchers in natural language processing (NLP). An implicit approach to solve this problem needs to aim at understanding the semantics of the user utterances, identifying the correct dialog policy to apply, and then generating or selecting the appropriate system response. The illustrative embodiments recognize that a practical solution for the aforementioned problem can yield applications in areas such as virtual agents and chat bots, and can be integrated for communication on various channels or devices, which offers great practical value.

One or more illustrative embodiments provide a system for predicting utterances in dialog applications using an n-gram language model which uses a quantized representation of the utterances. A feature provided in one or more of the illustrative embodiments is a quantized dialog language model for dialog systems. As previously discussed, the models that assign probabilities to sequences of words are called language models. In contrast to the traditional language models which focus on word sequences, illustrative embodiments provide for a quantized dialog language model can be used to predict the sequence of utterances directly.

SUMMARY

The illustrative embodiments provide a method, system, and computer program product. An embodiment of a method for predicting utterances in a dialog system includes receiving a set of utterances associated with a dialog between a client device and a dialog system, mapping the utterances to vector representations of the utterances, and identifying at least one cluster to which the utterances belong from among a plurality of possible clusters. The embodiment further includes predicting a next cluster based upon a conditional probability of the next cluster following a set of a predetermined number of previous clusters using a language model. The embodiment still further includes predicting a next utterance from among a plurality of possible utterances within the predicted next cluster. Thus, the embodiment provides a quantized representation of utterances to reduces the state space used to manage dialogs and facilitate decision making when compared to traditional dialog systems which use a large state space to manage dialogs.

An embodiment further includes receiving a plurality of training utterances, and mapping each of the plurality of training utterances to a vector representation of the training utterance to form a training utterance vector. The embodiment further includes calculating a distance measurement between each of the training utterance vectors, and determining a cluster for each of the training utterance vectors from a number of possible clusters based upon the calculated distance measurements. Thus, the embodiment provides for a quantized dialog language model that can be used to predict a sequence of utterances directly contrary to traditional language models which focus on word or character sequences.

An embodiment further includes assigning a cluster identifier to each training utterance vector, the cluster identifier identifying the cluster to which the particular training utterance is a member. Thus, the embodiment provides for representing a cluster by a cluster identifier that identifies the cluster to which the particular utterance belongs or is a member, resulting in a quantized representation of the utterances.

An embodiment further includes training a form of a language model based upon the cluster transitions, the language model including an assigning of the one or more probabilities to the cluster transitions. In an embodiment, the plurality of training utterances are received from a dialog database.

In an embodiment, determining the cluster for each of the training utterance vectors includes grouping a predetermined number of training utterance vectors that are closest in distance to one another into the same cluster.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 7 depicts examples of preprocessing utterances in accordance with an illustrative embodiment;

DETAILED DESCRIPTION

Figure 1:
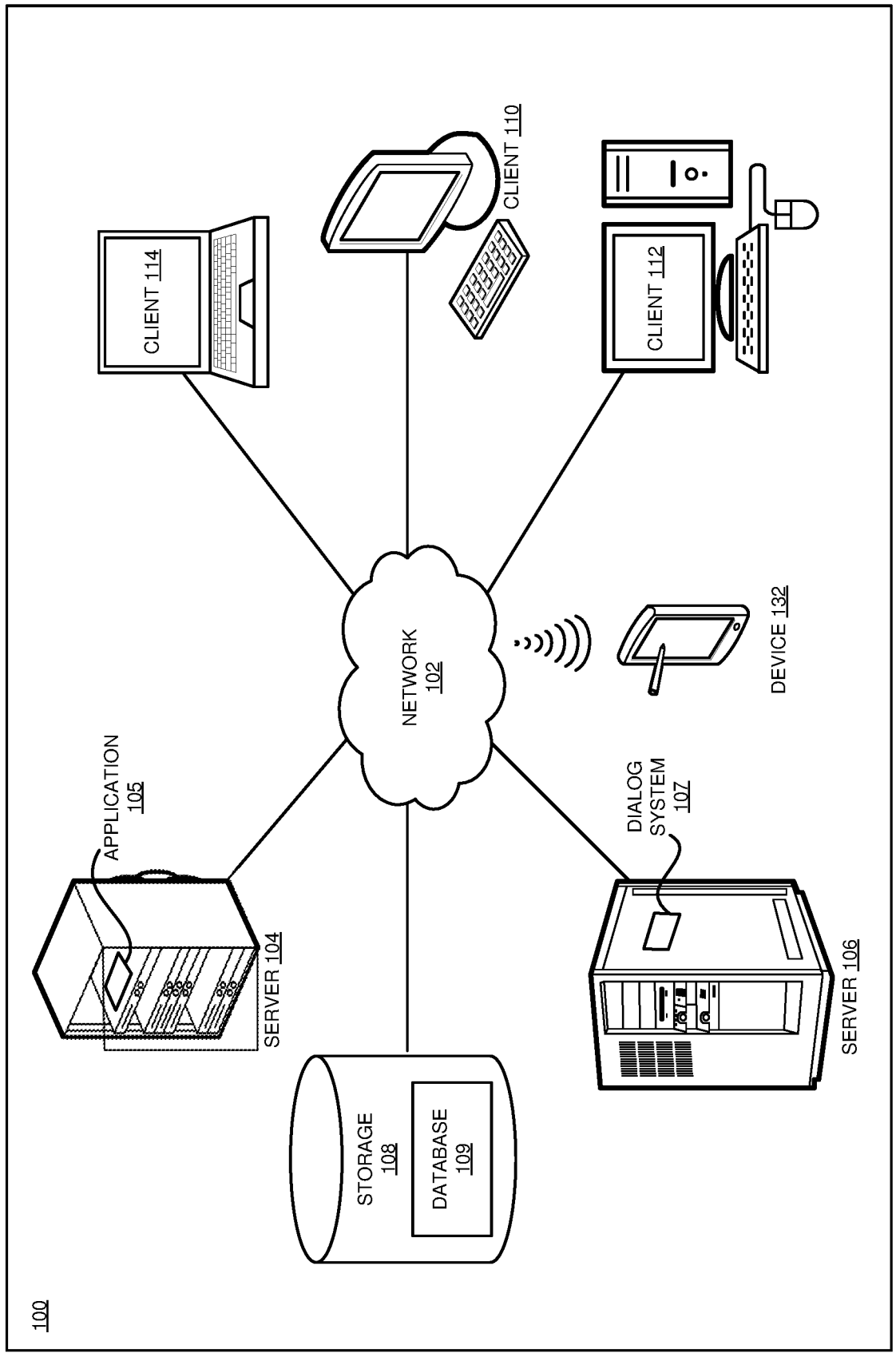
FIG. 1 depicts a block diagram of a network of data processing systems in which illustrative embodiments may be implemented.

The illustrative embodiments recognize that the presently available tools or solutions do not address these needs or provide adequate solutions for these needs. The illustrative embodiments used to describe the invention generally address and solve the above-described problems and other problems related to predicting utterances in a dialog system.

Various embodiments described herein provide for a quantized dialog language model for dialog systems. In one or more embodiments, a process of quantization of utterances involves multiple steps. In an embodiment, a first step of the process is utterance pre-processing. During pre-processing, in the embodiment stop-words (e.g.: 'the') are removed and entity values of utterances are replaced with entity types in order to generalize the utterances. In the embodiment, the preprocessed utterances are next mapped to vectors. In one or more embodiments, mapping of utterances to vectors can be performed using multiple approaches depending on the application. Example approaches for mapping of utterances to vectors include, the occurrence of tokens in the utterance (for example, a bag-of-words approach), and use of the surrounding utterances in the dialog to learn utterance vectors (for example, a Skip-thought approach). In the embodiment, a measure of similarity between the utterances is computed. As the utterances have been mapped to a vector space, in one or more embodiments utterance similarities are determined by computing a distance between the corresponding vectors. In the embodiment, the utterances are quantized by clustering the utterance vectors based on the calculated distances among the utterances. Once the utterances are quantized, in the embodiment each utterance is associated with a cluster number. In the embodiment, changes between clusters that may occur during a conversation are used to identify common patterns in dialogs. In the embodiment, a quantized dialog language model is constructed based on the frequencies of cluster changes in dialogs. In the embodiment, the quantized dialog language model is used to predict the probability of a next cluster based on a previous n clusters. One or more embodiments of the dialog system described herein using a quantized dialog language model outperform previous models, such as multi-layer perceptron neural networks and end-to-end memory networks, for addressing the next utterance prediction problem.

In one or more embodiments, the quantized dialog language model includes multiple modules used during a training process and a runtime process. Natural language utterances contain a large amount of information that may be unnecessary in a decision-making process. In the embodiment, the utterance preprocessing module removes unnecessary information to preprocess the utterances. In some cases, the exact entities found in an utterance are not important for general pattern identification. For example, consider the following two utterances which could be typically found in a restaurant reservation system: 1) "I would like to have Chinese food today" and 2) "I would like to have Korean food today". The purpose of both utterances is to mention a certain cuisine type which could be used by the system while making the reservation. In a particular embodiment, both of these utterances are preprocessed into 'I would like to have CUISINE_TYPE food today', which generalizes the purpose of this type of utterance.

In the embodiment, the training process further includes mapping of utterances to a vector. In the embodiment, the mapping of each utterance into a vector is performed in a manner that aims at capturing the semantics and syntax of the underlying utterance. The corresponding vectors that represent the utterances can in turn be used to calculate distances between utterances in the quantization process. In various embodiments, multiple mapping techniques can be used to map utterances to vectors.

In a particular embodiment, Skip-thought vectors as described in Kiros, Ryan, et al. "Skip-thought vectors." Advances in neural information processing systems, 2015 are used to map utterances to vectors. In a Skip-thought model, previous and posterior sentences are used to learn sentence vectors. The Skip-thought algorithm follows an encoder-decoder model in which the encoder maps the input sentence to a sentence vector using a RNN encoder with a Gate Recurrent Unit (GRU), and the decoder generates the sentences around this approach. In the particular embodiment, a cosine similarity between the vectors can be used as a distance measure. After distances are calculated between utterance vectors, a clustering algorithm is used to cluster the utterance vectors into a number of clusters. In a particular embodiment, a bottom-up clustering algorithm is used to identify clusters for a restaurant reservation system.

In the embodiment, the training process further includes utterance quantization and language model construction stages. In the embodiment, once clusters are created from the utterance vectors, each utterance can be represented by a cluster identifier that identifies the cluster to which the particular utterance belongs or is a member, resulting in a quantized representation of the utterances. After the utterances are quantized, a conversation can be represented as a set of clusters. Consider a dialog D, which comprises of a sequence of utterances $\{u_1, u_2, \ldots u_j\}$, where $u_i$ is a natural language utterance. Following the identification of the cluster to which each utterance $u_i$ belongs, the same dialog D can be represented as a set of numbers $\{c_1, c_2, \ldots c_j\}$, where each $c_i$ corresponds to the cluster identifier to which $u_i$ belongs. In an embodiment, cluster transitions for all dialogs are used to construct an n-gram language model in which probabilities are assigned to transitions between clusters. The n-gram language model estimates the probability $P(c_j | c_{(j-n)}, \ldots, c_{(j-1)})$. In particular embodiments, the language model can be implemented using techniques such as n-gram language models, feed-forward neural networks, memory networks and recurrent neural networks.

During the runtime, the embodiment receives a partial dialog as the input and predicts the next system utterance using the trained language model using an utterance prediction procedure. The utterance prediction problem is formalized as $\text{argMax}_v \, p \, (v|u_1, \ldots u_{(j-1)})$, where v denotes the utterance that maximizes the conditional probability with respect to all previous utterances. In the quantized dialog space, the problem of cluster prediction can be formulated as follows: $\text{argMax}_c \, p \, (c|c_1, \ldots, c_{(j-1)})$, where c is the cluster that maximizes the conditional probability with respect to the clusters associated with all the previous utterances. An n-gram language model can be used to approximate $\text{argMax}_c \, p \, (c|c_1, \ldots, c_{(j-1)})$ by means of $\text{argMax}_c \, p \, (c|c_{(j-n)}, \ldots, c_{(j-1)})$. If the set of utterances within a cluster are similar one to another, any utterance in the predicted cluster c can be outputted as the predicted utterance.

In one or more embodiments, the above described quantized dialog language model is applied to an end-to-end dialog system. In an example embodiment, users have to specify the location, type of cuisine, and number of people and atmosphere of a restaurant in order to make a reservation. When the dialog system needs more information to find the restaurant, it asks appropriate questions to the user to gather that information. Once the system has all the information it makes an application programming interface (API) call to obtain a proper set of restaurants from a database. In the particular example, the reservation procedure includes issuing an API call, updating the API call, displaying options, providing extra information, and conducting a full dialog. In one or more embodiments, a comparison of the performance of the quantized dialog language model described herein against utterance prediction systems that use multi-layer feed-forward neural networks and memory networks indicates that the utterance prediction system based on quantized dialog language model outperforms the other systems for utterance prediction.

In one or more embodiments, the quantized representation of utterances described herein reduces the state space used to manage dialogs and facilitates decision making when compared to traditional dialog systems which use a large state space to manage dialogs. In one or more embodiments, the quantized dialog language model can be used to predict a sequence of utterances directly contrary to traditional language models which focus on word or character sequences.

The quantized dialog language model described herein is unavailable in the presently available dialog systems. A method of an embodiment described herein can be used to quickly adapt to a range of conversations, learn with less amount data, detect and learn the dialog policies, and achieve better accuracy with smaller amount of data.

One or more embodiments provide for a process of quantizing user input and system output per turn based on data, thus limiting the possible space of responses per turn. One or more embodiments provide for the ability to create 1-gram, 2-gram, n-gram language models for managing a 1st, 2nd, . . . , and nth turn in a dialog system. One or more embodiments provide for a language model on the sentence/turn level not the typical word level. In one or more embodiments, the dialog system learns directly from data and can improve with the collection of additional data during operation. In one or more embodiments, the dialog system uses representations for entity classes in the sentence/utterances thus making the training more robust and requiring less data.

An embodiment can be implemented as a software application. The application implementing an embodiment, or one or more components thereof, can be configured as a modification of an existing dialog system—i.e., a native application in the dialog system, as an application executing in a data processing system communicating with an existing dialog system over a short-range radio network such as Bluetooth, over a wired or wireline local area network (LAN)—i.e., a local application on the LAN, as an application executing in a data processing system communicating with an existing dialog system over a wide area network (WAN)—i.e., a remote application on the WAN, as a separate application that operates in conjunction with an existing v system in other ways, a standalone application, or some combination thereof.

The illustrative embodiments are described with respect to certain types of utterances, natural languages, dialogs, representations, processing, clusters, quantization, algorithms, predictions, language models, challenges, environments, neural networks, conversation agents, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
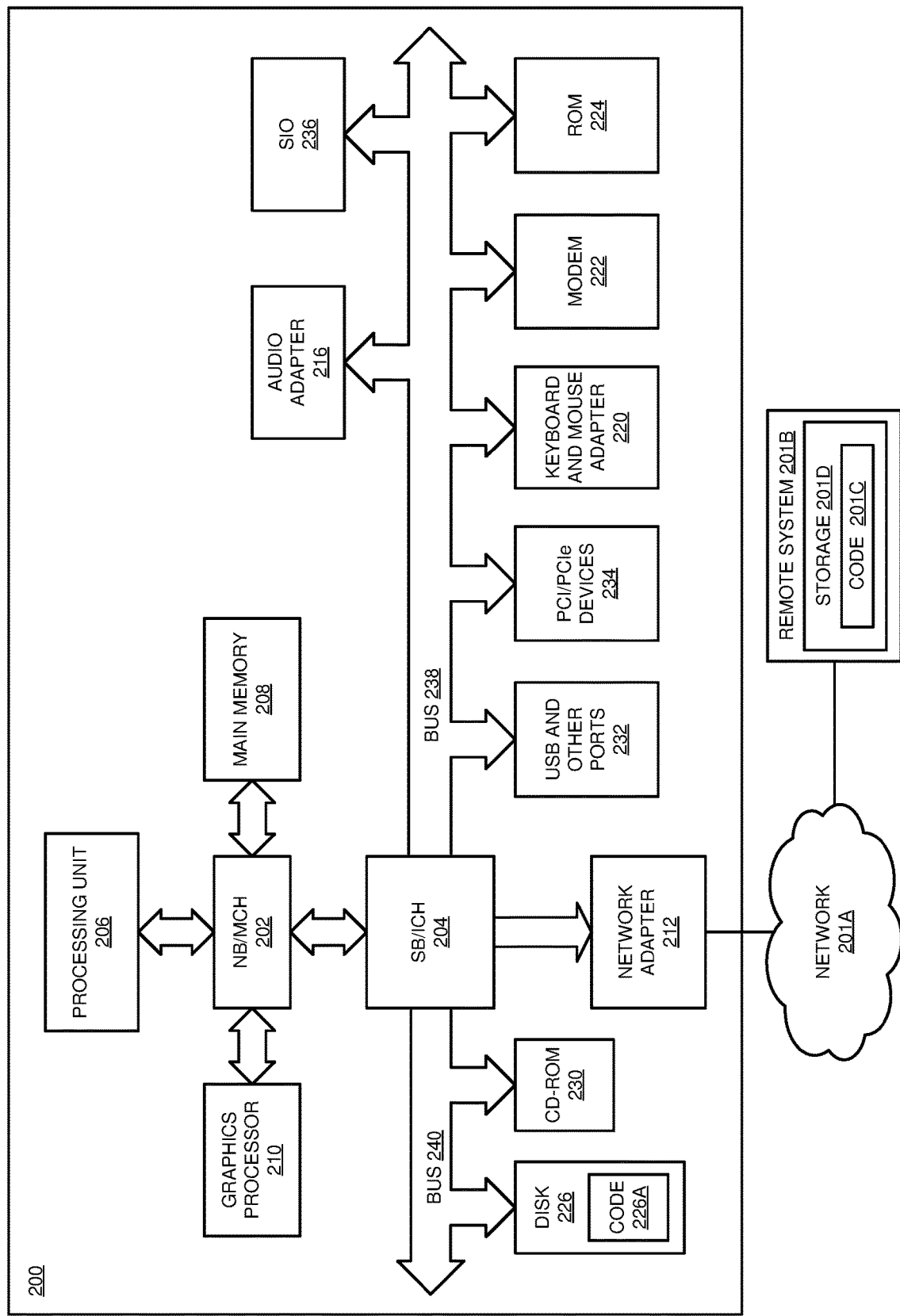
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Storage unit 108 includes a database 109. In particular embodiments database 109 includes a dialog database containing one or more training utterances for training a language model as described herein. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Dialog system 107 is an existing dialog system whose abilities are enhanced or improved as described herein by operating application 105 in conjunction with dialog system 107.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG.

2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
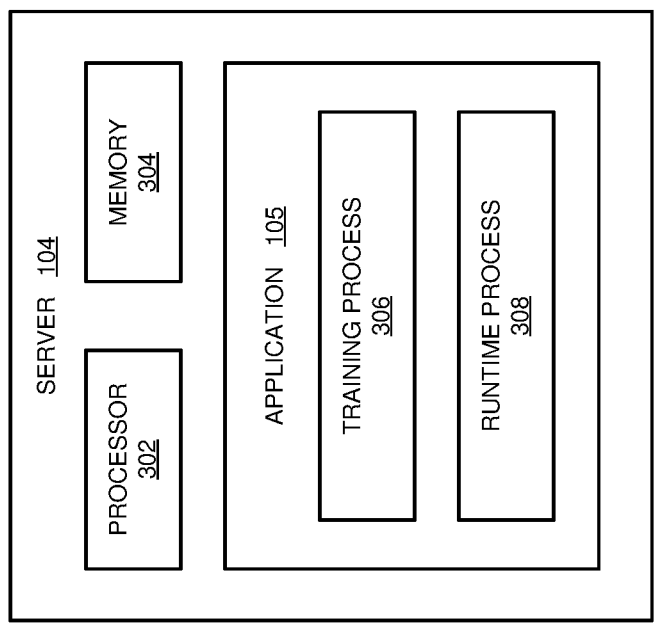
FIG. 3 depicts a block diagram of an example configuration of a server in accordance with an illustrative embodiment.

With reference to FIG. 3, this figure depicts a block diagram of an example configuration of a server in accordance with an illustrative embodiment. Server 104 is an example of 104 of FIG. 1 and includes a processor 302, a memory 304, and an application 105. Processor 302 is configured to retrieve instructions from memory 304 and execute the instructions to perform various operations of server 104 as described herein.

Application 105 includes a training process component 306 and a runtime process component 308. Application 105 is configured to perform operations associated with predicting utterances in a dialog system using a quantized dialog language model. Training process component 306 is configured to perform a training process associated with predicting utterances in a dialog system using a quantized dialog language model as further described herein. Runtime process component 308 is configured to perform a runtime process associated with predicting utterances in a dialog system using a quantized dialog language model as further described herein.

Figure 4:
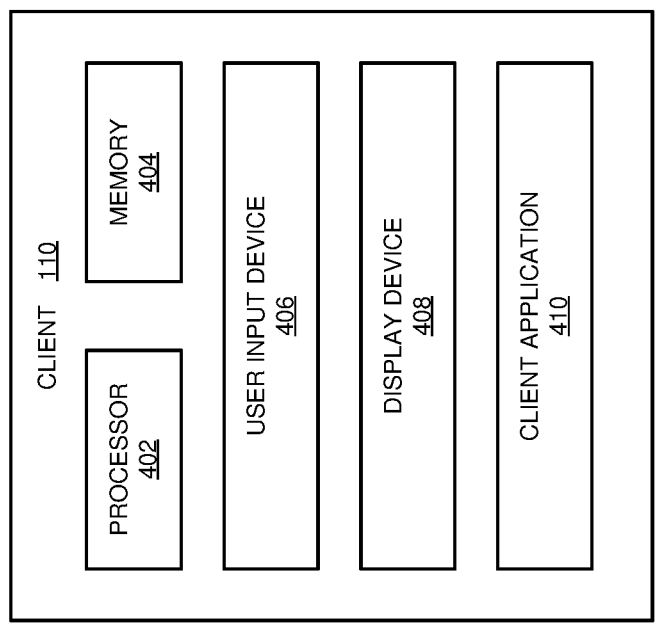
FIG. 4 depicts a block diagram of an example configuration of a client in accordance with an illustrative embodiment.

With reference to FIG. 4, this figure depicts a block diagram of an example configuration of a client in accordance with an illustrative embodiment. Client 110 is an example of client 110 of FIG. 1 and includes a processor 402, a memory 404, a user input device 406, a display device 408, and a client application 410. Processor 402 is configured to retrieve instructions from memory 404 and execute the instructions to perform various operations of client device 110 as described herein. In one or more embodiments, user input device 406 is configured to provide one or more input devices to allow the user to interact with client device 110 such as provide one or more utterances to a dialog system. In one or more embodiments, display device 408 is configured to dialog system output to a user of client device 110. Client application 410 is configured to communication with one or more of application 105 and dialog system 107 to facilitate a dialog with between a user of client 110 and dialog system 107.

Figure 5:
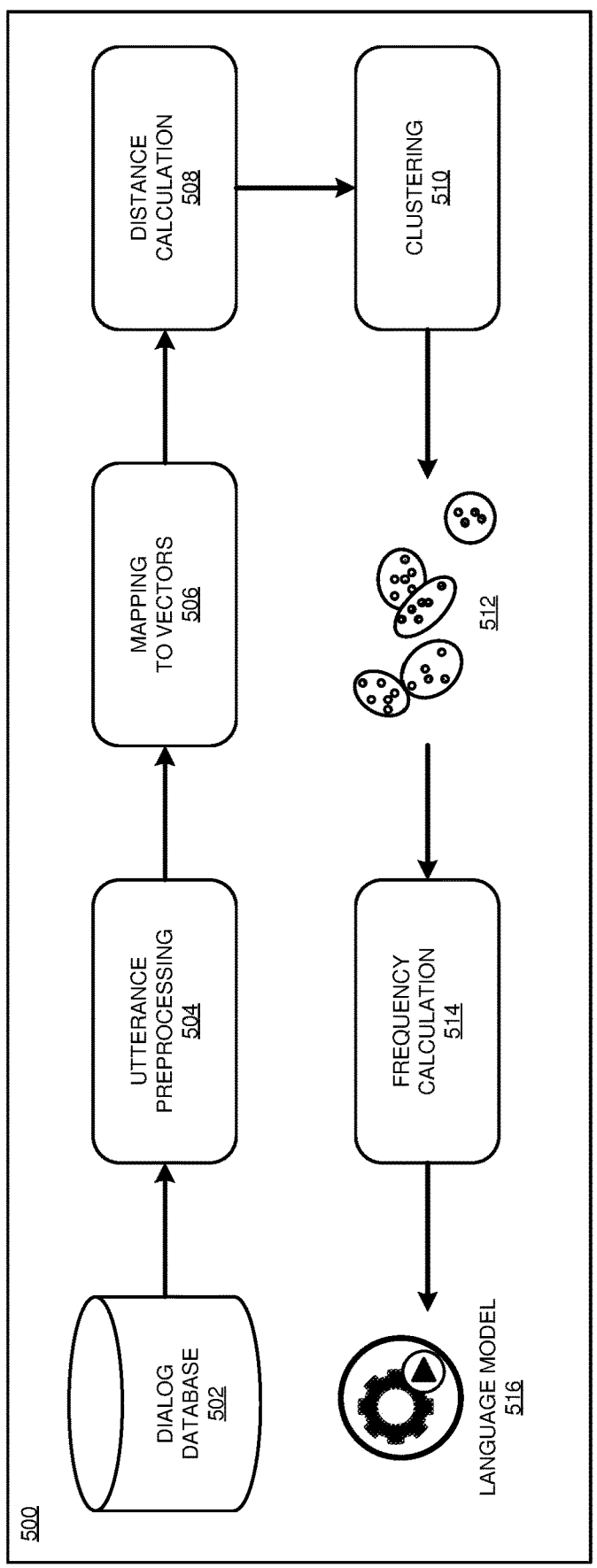
FIG. 5 depicts a block diagram of a training process flow in accordance with an illustrative embodiment.

With reference to FIG. 5, this figure depicts a block diagram of a training process flow 500 in accordance with an illustrative embodiment. In the embodiment, a dialog database 502 provides one or more training utterances to an utterance preprocessing component 504. Utterance preprocessing module 504 is configured to preprocess the utterances by removing unnecessary information and performing delexicalization of the utterances. In some cases, the exact entities found in an utterance in a dialog are not important for identifying patterns that occur in dialogs and generating the next utterance in the dialog.

The embodiment further includes a mapping to vectors component 506 configured to map the preprocessed utterances to a vector space. In an embodiment, mapping to vectors component 506 maps each preprocessed utterance into a vector representation of the utterance. In one or more embodiments, the mapping is performed in a manner that captures the semantics and syntax of the underlying utterance. In one or more embodiments, various mapping algorithms can be used to map a particular utterance to a vector such as Skip-thought vectors and bag-of-words encoding on a yielded vocabulary.

In the embodiment, a distance calculation component 508 calculates distances between the vector representations of the utterances. In particular embodiments, the distance measure depends on the process used to map the utterances to vectors. For example, for Skip-thought vectors, a cosine distance measurement may be used. In another example, for bag-of-words encoding, an edit distance measure may be used. In the embodiment, a clustering component 510 uses a clustering algorithm to cluster the utterance vectors into a number of clusters 512 based upon the distance calculation such that utterance vectors that are closest in distance to one another are grouped into the same cluster. In a particular embodiment, the utterance vectors are clustered into a predetermined number, k, of possible clusters based upon the distance calculation. In the embodiment, once clusters are created from the utterance vectors, each utterance can be represented by a cluster identifier that identifies the cluster to which the particular utterance belongs, resulting in a quantized representation of the utterances.

After the utterances are quantized, a conversation can be represented as a set or sequence of clusters. Consider a dialog D, which comprises of a sequence of utterances $\{u_1, u_2, \ldots u_j\}$, where $u_i$ is a natural language utterance. Following the identification of the cluster to which each utterance $u_i$ belongs, the same dialog D can be represented as a set of numbers $\{c_1, c_2, \ldots c_j\}$, where each $c_i$ corresponds to the cluster identifier to which $u_i$ belongs.

The embodiment further includes a frequency calculation component 514 to calculate frequencies of cluster changes in dialogs of dialog database 502 and predicts a probability of a next cluster based upon a predetermined number of previous clusters to construct an n-gram language model 516. In an embodiment, cluster transitions for all dialogs are used to construct an n-gram language model in which probabilities are assigned to transitions between clusters. The n-gram language model identifies the probability P $(c_j c_{(j-n)}, \ldots, c_{(j-1)})$. Accordingly, the n-gram language model identifies the probability P $(c_j c_{(j-n)}, \ldots, c_{(j-1)})$ of a next cluster based on the previous n clusters.

Figure 6:
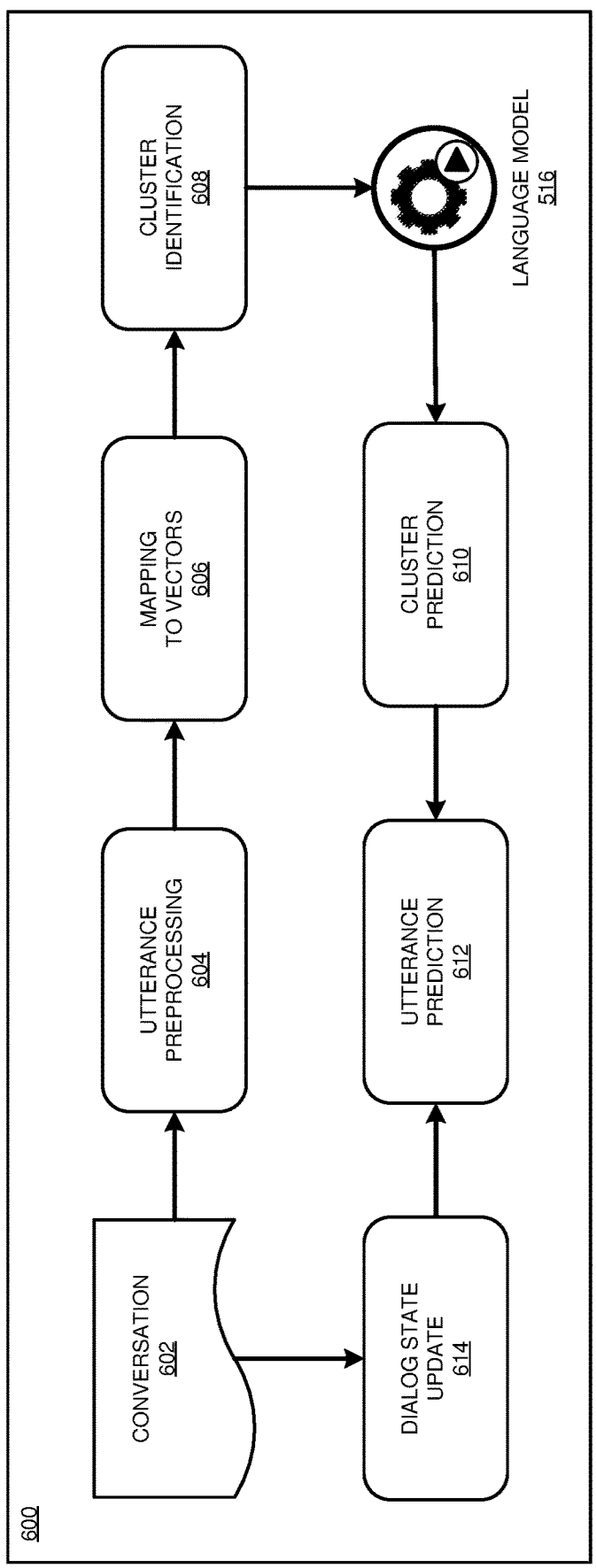
FIG. 6 depicts a block diagram of a runtime process flow in accordance with an illustrative embodiment.

With reference to FIG. 6, this figure depicts a block diagram of a runtime process flow 600 in accordance with an illustrative embodiment. In the embodiment, a conversation 602 is initiated between a user and a dialog system in which one or more utterances are received by the runtime process in order to predict a next utterance using the trained language model 516 of FIG. 5 using an utterance prediction procedure. In one or more embodiments, the utterance prediction problem is formalized as $\text{argMax}_v\ p\ (v|u_1, \ldots u_{(j-1)})$, where v denotes the utterance that maximizes the conditional probability with respect to all previous utterances. In the quantized dialog space, a corresponding problem can be formulated as a cluster prediction problem as follows: $\text{argMax}_c\ p\ (c|c_1, \ldots, c_{(j-1)})$, where c is the cluster that maximizes the conditional probability with respect to the clusters associated with all the previous utterances. The required conditional probability can be estimated by the n-gram language model and consequently $\text{argMax}_c\ p\ (c|c_1, \ldots c_{(j-1)})$=approximately $\text{argMax}_c\ p\ (c|c_{(j-n)}, \ldots, c_{(j-1)})$. If the set of utterances within a cluster are similar, any utterance in the predicted cluster c can be outputted as the predicted utterance.

In the embodiment, an utterance preprocessing component 604 is configured to preprocess the received utterances by removing unnecessary information and performing delexicalization of the utterances. In one or more embodiments, utterance preprocessing module 604 removes a particular utterance and replaces the particular utterance with an indication of a general type of the utterance.

The embodiment further includes a mapping to vectors component 606 configured to map the preprocessed utterances to a vector space. In an embodiment, mapping to vectors component 606 maps each preprocessed utterance into a vector representation of the utterance. In one or more embodiments, the mapping is performed in a manner that captures the semantics and syntax of the underlying utterance.

The embodiment further includes a cluster identification component 608 configured to determine the cluster to which the utterance vector belongs. A cluster prediction component 610 utilizes the identified cluster and language model 516 to predict a next cluster based upon the probabilities within language model 516. An utterance prediction component 612 is configured to predict the next utterance within the dialog based upon the predicted cluster. In one or more embodiments, if all of the utterances in the predicted cluster are the same, any utterance in the predicted cluster can be used as the predicted utterance. In one or more embodiments, if the utterances in the predicted cluster are different, a selection model is used to select a particular predicted utterance in the predicted cluster. In a particular embodiment, a seq2seq model can be used to evaluate the utterances within the cluster $\text{Argmax}_u\ p_{seq2seq}(u|U, c)$; in which U is the context, c is the predicted cluster, and p_seq2seq is the probability given by the seq2seq model. In one or more embodiments, a dialog state update component 614 is configured to update a dialog state using utterances from the conversation and provides the updated dialog state to utterance prediction component 612 to be used to assist in predicting the next utterance.

With reference now to FIG. 7, this figure depicts examples 700 of preprocessing utterances in accordance with an illustrative embodiment. The example is extracted from the dataset of DSTC-6 'End-to-End Goal Oriented Dialog Learning' track. The embodiment includes examples of utterances before preprocessing 702 and corresponding utterances after preprocessing 704 during a dialog to make a reservation at a restaurant between a user and a dialog system. In the example, a user utterance of "can you book a table with french cuisine in a moderate price range in rome" is preprocessed to "can you book a table with CUISINE_TYPE in a PRICE_RANGE in LOCATION". In the example, "french cuisine" is replaced with a more general "CUISINE_TYPE", "moderate price range" is replaced with a more general "PRICE_RANGE", and "rome" is replaced with a more general "LOCATION". In another example, a user utterance of "for four people please" is replaced with "for NUMBER_OF_PEOPLE people please". In another example, a system utterance of "what do you think of this option: resto_rome_moderate_french_7stars" is replaced with "what do you think of this option: RESTAURANT_NAME".

Figure 8:
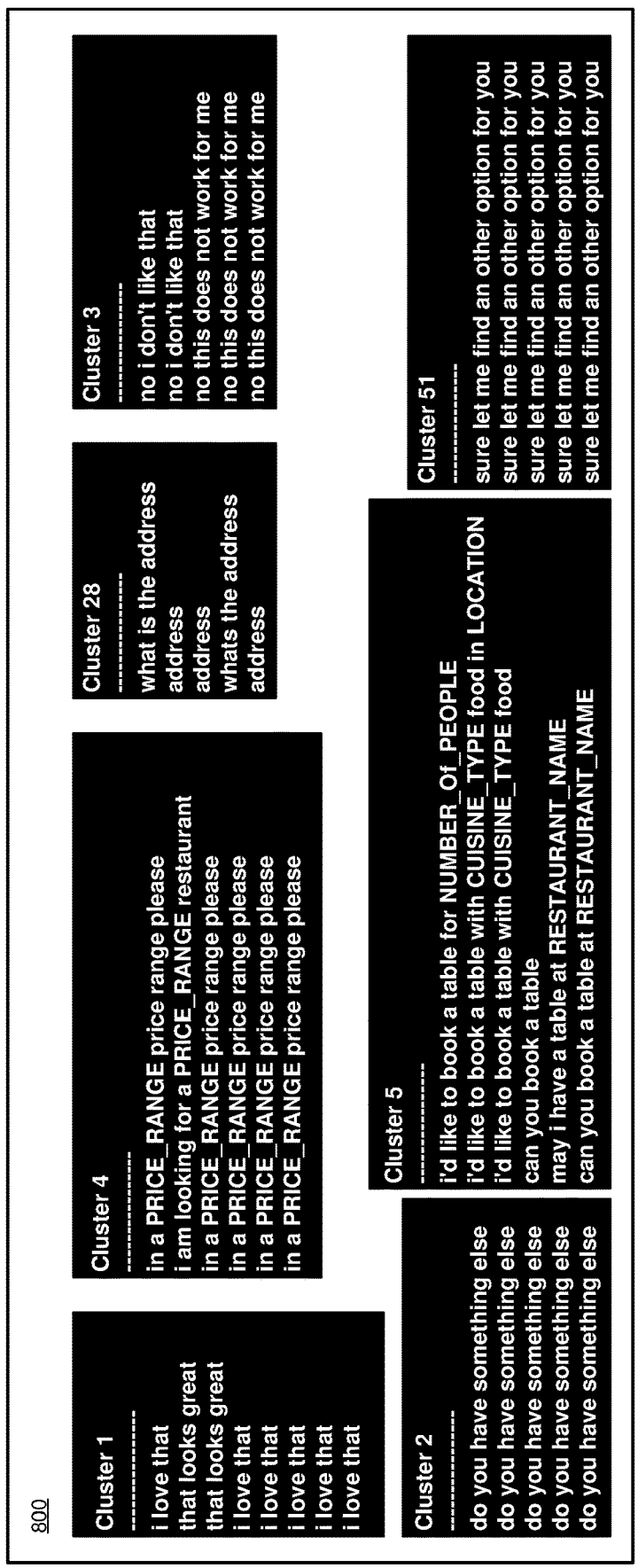
FIG. 8 depicts examples of clusters in accordance with an illustrative embodiment.

With reference now to FIG. 8, this figure depicts examples 800 of clusters in accordance with an illustrative embodiment. In the examples 800, utterances having utterances vectors that have distances between one another that are within a particular threshold are grouped together in the same cluster such that utterances in the same cluster convey the same or similar idea. In an example Cluster 1, the utterances such as "I love that" and "that looks great" are grouped into the same Cluster 1. The utterance "do you have something else", which refers to a user asking for a different option from the system, is the example Cluster 2. In an example Cluster 3, the utterances "no I don't like that" and "no this does not work for me" are grouped into the same Cluster 3.

In an example Cluster 4, utterances of "in a PRICE_RANGE price range please", "i am looking for a PRICE_RANGE restaurant" and "in a PRICE_RANGE price range please" are grouped into the same Cluster 4. In an example Cluster 5, utterances of "i'd like to book a table for NUMBER_OF_PEOPLE", "i'd like to book a table with CUISINE_TYPE food in LOCATION", i'd like to book a table with CUISINE_TYPE food", "can you book a table", "may I have a table at RESTAURANT_NAME", and "can you book at table at RESTAURANT_NAME" are grouped into the same Cluster 5.

In an example Cluster 28, the utterances "what is the address" and "address" are grouped into the same Cluster 28. The example Cluster 51 is composed of the system utterance "sure let me find another option for you".

Figure 9:
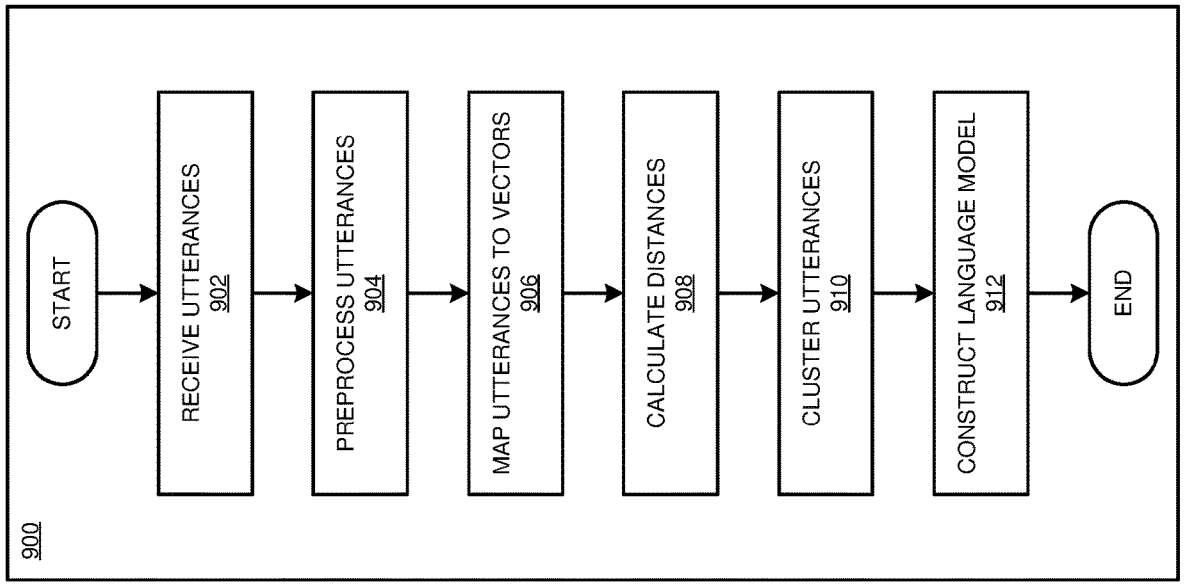
FIG. 9 depicts a flowchart of an example training process for a dialog system using the quantized dialog language model in accordance with an illustrative embodiment.

With reference to FIG. 9, this figure depicts a flowchart of an example training process 900 for a dialog system using the quantized dialog language model in accordance with an illustrative embodiment. In block 902, application 105 receives one or more training utterances from dialog database 502. In block 904, application 105 preprocess the training utterances by removing unnecessary information and/or performing delexicalization of the utterances.

In block 906, application 105 maps each preprocessed training utterance into a vector representation of the utterance to form a training utterance vector. In block 908, application 105 calculates distance measures between each of the vector representations of the training utterances. In particular embodiments, the distance measure depends on the mapping process used to map the utterances to vectors. For example, for Skip-thought vectors, a cosine distance measurement may be used. In another example, for bag-of-words encoding an edit distance measure may be used.

In block 910, application 105 determines a cluster for each of the training utterance vectors based upon the calculated distance measurements. In a particular embodiment, application 105 uses a clustering algorithm to cluster each of the utterance vectors into a particular cluster. Based on the distance calculation, the utterance vectors that are closest in distance to one another are grouped into the same cluster. In a particular embodiment, the utterance vectors are clustered into a predetermined number, k, of possible clusters based upon the distance calculation. In an embodiment, application 105 assigns a cluster identifier to each training utterance vector that identifies the particular cluster to which the particular training utterance belongs, resulting in a quantized representation of the training utterance.

In block 912, application 105 constructs a language model based upon cluster transitions of a predetermined number of previous clusters in training data. For example, an n-gram language model identifies the probability P ($c_j$ $c_{(j-n)}$, . . . , $c_{(j-1)}$) of a next cluster based on the previous n clusters. Process 900 then ends.

Figure 10:
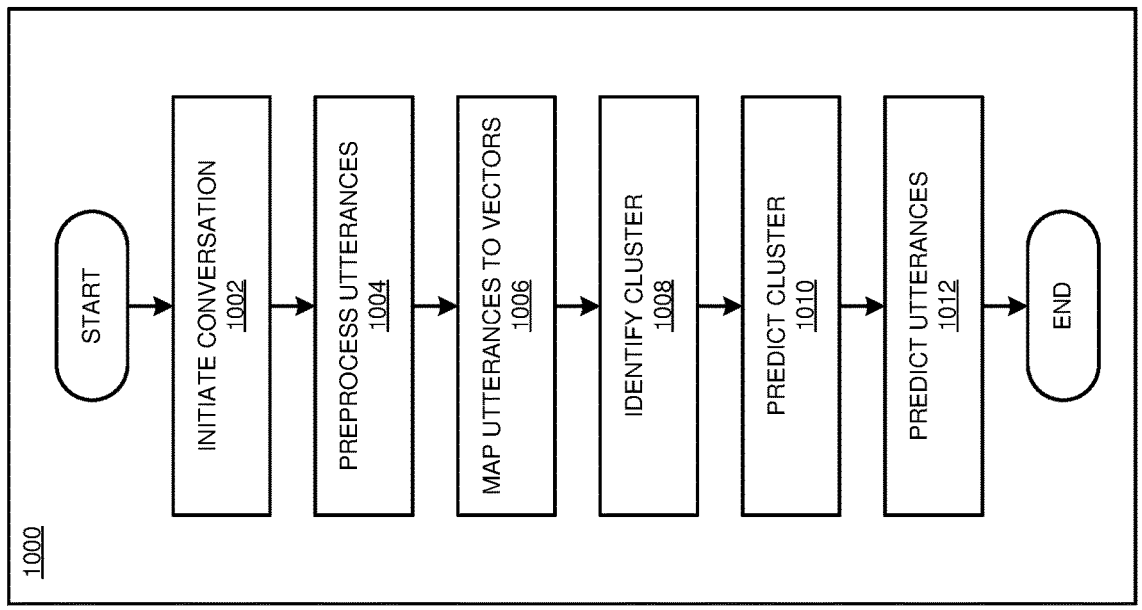
FIG. 10 depicts a flowchart of an example runtime process for a dialog system using the quantized dialog language model in accordance with an illustrative embodiment.

With reference to FIG. 10, this figure depicts a flowchart of an example runtime process 1000 for a dialog system using the quantized dialog language model in accordance with an illustrative embodiment. In block 1002, a conversation is initiated between a user of client device 110 and dialog system 107 in which one or more utterances are received by the runtime process in order to predict a next utterance using a trained language model. In block 1004, application 105 preprocess the received utterances and in block 1006, application 105 maps each preprocessed utterance into a vector representation of the utterance to form an utterance vector. In one or more embodiments, the mapping is performed in a manner that captures the semantics and syntax of the underlying utterance.

In block 1008, application 105 identifies a cluster to which the utterance vector belongs or is a member by selecting a cluster containing the utterance vector from among a plurality of possible clusters. In block 1010, application 105 predicts a next cluster based upon the identified cluster and one or more probabilities the language model. In a particular embodiment, predicting the next cluster utilizes the identified cluster and language model 516 to predict a next cluster based upon a conditional probability of the next cluster following a set of a predetermined number of previous clusters within language model 516 in which at least one of the previous clusters includes the identified cluster.

In block 1012, application 105 predicts a next utterance from among a plurality of possible utterances within the predicted next cluster. In one or more embodiments, if all of the utterances in the predicted next cluster are the same, any utterance in the predicted next cluster can be used as the predicted utterance. In one or more embodiments, if the utterances in the predicted next cluster are different, a selection model is used to select a particular predicted utterance in the predicted next cluster. In a particular embodiment, a seq2seq model can be used to evaluate the utterances within the next cluster Argmax$_u$ $p_{seq2seq}$(u|U, c); in which U is the context, c is the predicted cluster and $p_{seq2seq}$ is the probability given by the seq2seq model. Process 1000 then ends.

Thus, a computer implemented method, system or apparatus, and computer program product are provided in the illustrative embodiments for a dialog system using the quantized dialog language model and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for predicting utterances in a dialog system, comprising:
   receiving, at runtime, an utterance associated with a user-initiated dialog between a client device and a dialog system, wherein each utterance represents a turn in the dialog;
   preprocessing the utterance by replacing a particular phrase of the utterance with an indication of a type of the particular phrase;
   mapping the preprocessed utterance to a vector representation of the utterance;
   identifying, by use of the vector representation, at least one cluster to which the preprocessed utterance belongs from among a plurality of clusters,
   wherein each of the plurality of possible clusters comprises clustered utterance vectors;

predicting a next cluster based upon a conditional probability of the next cluster following a set of a predetermined number of previous clusters using a language model,
wherein the language model is an n-gram language model trained to predict a next cluster from a previous sequence of n clusters, where $n \geq 1$ and where the clusters are sequenced to represent turns of dialog;
predicting a next utterance from among a plurality of possible utterances within the predicted next cluster; and
outputting to the client device the predicted next utterance as a next system utterance.

2. The method of claim 1, further comprising a training phase prior to the runtime, the training phase comprising:
receiving a plurality of training utterances;
mapping each of the plurality of training utterances to a vector representation of the training utterance to form a training utterance vector;
calculating a distance measurement between each of the training utterance vectors; and
determining a cluster for each of the training utterance vectors from a number of possible clusters based upon the calculated distance measurements.

3. The method of claim 2, further comprising:
assigning a cluster identifier to each training utterance vector, the cluster identifier identifying the cluster to which the particular training utterance is a member.

4. The method of claim 3, further comprising:
estimating one or more probabilities of a next cluster based upon cluster transitions of a predetermined number of previous training clusters.

5. The method of claim 4, further comprising:
training a form of a language model based upon the cluster transitions, the language model including an assigning of the one or more probabilities to the cluster transitions.

6. The method of claim 2, wherein the plurality of training utterances are received from a dialog database; and
wherein the type of utterance is selected from the group consisting of cuisine type, price range, location, number of people, and restaurant name.

7. The method of claim 2, wherein determining the cluster for each of the training utterance vectors includes grouping a predetermined number of training utterance vectors that are closest in distance to one another into a same cluster.

8. A computer usable program product comprising one or more computer-readable storage devices, and program instructions stored on at least one of the one or more storage devices, the stored program instructions comprising:
program instructions to receive, at runtime, an utterance associated with a user-initiated dialog between a client device and a dialog system, wherein each utterance represents a turn in the dialog;
program instructions to preprocess the utterance by replacing a particular phrase of the utterance with an indication of a type of the particular phrase;
program instructions to map the preprocessed utterance to a vector representation of the utterance;
program instructions to identify, by use of the vector representation, at least one cluster to which the preprocessed utterance belongs from among a plurality of clusters,
wherein each of the plurality of possible clusters comprises clustered utterance vectors;
program instructions to predict a next cluster based upon a conditional probability of the next cluster following a set of a predetermined number of previous clusters using a language model,
wherein the language model is an n-gram language model trained to predict a next cluster from a previous sequence of n clusters, where $n \geq 1$ and where the clusters are sequenced to represent turns of dialog;
program instructions to predict a next utterance from among a plurality of possible utterances within the predicted next cluster; and
program instructions to output to the client device the predicted next utterance as a next system utterance.

9. The computer usable program product of claim 8, further comprising a training phase prior to the runtime, the training phase comprising:
program instructions to receive a plurality of training utterances;
program instructions to map each of the plurality of training utterances to a vector representation of the training utterance to form a training utterance vector;
program instructions to calculate a distance measurement between each of the training utterance vectors; and
program instructions to determine a cluster for each of the training utterance vectors from a number of possible clusters based upon the calculated distance measurements.

10. The computer usable program product of claim 9, further comprising: program instructions to assign a cluster identifier to each training utterance vector, the cluster identifier identifying the cluster to which the particular training utterance is a member.

11. The computer usable program product of claim 10, further comprising:
program instructions to estimate one or more probabilities of a next cluster based upon cluster transitions of a predetermined number of previous training clusters.

12. The computer usable program product of claim 11, further comprising:
computer instructions to train a form of a language model based upon the cluster transitions, the language model including an assigning of the one or more probabilities to the cluster transitions.

13. The computer usable program product of claim 9, wherein the plurality of training utterances are received from a dialog database; and
wherein the type of utterance is selected from the group consisting of cuisine type, price range, location, number of people, and restaurant name.

14. The computer usable program product of claim 8, wherein the program instructions are stored in a computer readable storage device in a data processing system, and wherein the program instructions are transferred over a network from a remote data processing system.

15. The computer usable program product of claim 8, wherein the program instructions are stored in a computer readable storage device in a server data processing system, and wherein the program instructions are downloaded over a network to a remote data processing system for use in a computer readable storage device associated with the remote data processing system.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
- program instructions to receive, at runtime, an utterance associated with a user-initiated dialog between a client device and a dialog system, wherein each utterance represents a turn in the dialog;
- program instructions to preprocess the utterance by replacing a particular phrase of the utterance with an indication of a type of the particular phrase;
- program instructions to map the preprocessed utterance to a vector representation of the utterance;
- program instructions to identify, by use of the vector representation, at least one cluster to which the preprocessed utterance belongs from among a plurality of clusters,
- wherein each of the plurality of possible clusters comprises clustered utterance vectors;
- program instructions to predict a next cluster based upon a conditional probability of the next cluster following a set of a predetermined number of previous clusters using a language model,
- wherein the language model is an n-gram language model trained to predict a next cluster from a previous sequence of n clusters, where n≥1 and where the clusters are sequenced to represent turns of dialog;
- program instructions to predict a next utterance from among a plurality of possible utterances within the predicted next cluster; and
- program instructions to output to the client device the predicted next utterance as a next system utterance.

17. The computer system of claim 16, further comprising a training phase prior to the runtime, the training phase comprising:
- program instructions to receive a plurality of training utterances;
- program instructions to map each of the plurality of training utterances to a vector representation of the training utterance to form a training utterance vector;
- program instructions to calculate a distance measurement between each of the training utterance vectors; and
- program instructions to determine a cluster for each of the training utterance vectors from a number of possible clusters based upon the calculated distance measurements.

18. The computer system of claim 17, further comprising:
program instructions to assign a cluster identifier to each training utterance vector, the cluster identifier identifying the cluster to which the particular training utterance is a member.

19. The computer system of claim 18, further comprising:
program instructions to estimate one or more probabilities of a next cluster based upon cluster transitions of a predetermined number of previous training clusters.

20. The computer system of claim 19, further comprising:
computer instructions to train a form of a language model based upon the cluster transitions, the language model including an assigning of the one or more probabilities to the cluster transitions.

* * * * *